United States Patent
Shaffer et al.

(10) Patent No.: US 9,041,797 B2
(45) Date of Patent: May 26, 2015

(54) VIDEO CONTROLLED VIRTUAL TALK GROUPS

(75) Inventors: Shmuel Shaffer, Palo Alto, CA (US); Kittur V. Nagesh, Saratoga, CA (US); Dean Zanone, Norco, CA (US); Shah Talukder, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2243 days.

(21) Appl. No.: 11/594,577

(22) Filed: Nov. 8, 2006

(65) Prior Publication Data

US 2008/0108339 A1 May 8, 2008

(51) Int. Cl.
| | | |
|---|---|---|
| *H04N 7/18* | (2006.01) | |
| *G08B 13/196* | (2006.01) | |
| *H04M 3/56* | (2006.01) | |
| *H04M 11/04* | (2006.01) | |
| *H04N 7/15* | (2006.01) | |
| *H04W 4/08* | (2009.01) | |
| *H04W 4/22* | (2009.01) | |
| *H04W 76/00* | (2009.01) | |

(52) U.S. Cl.
CPC . *G08B 13/19608* (2013.01); *H04M 2215/2093* (2013.01); *G08B 13/19645* (2013.01); *G08B 13/19656* (2013.01); *H04M 3/56* (2013.01); *H04M 11/04* (2013.01); *H04M 2242/14* (2013.01); *H04N 7/157* (2013.01); *H04N 7/181* (2013.01); *H04W 4/08* (2013.01); *H04W 4/22* (2013.01); *H04W 76/002* (2013.01); *H04W 76/007* (2013.01)

(58) Field of Classification Search
CPC ............... H04L 29/06442; H04L 29/06414; H04L 12/1859; H04L 12/60; H04L 67/26; H04W 4/10; H04M 2215/2093
USPC ............ 348/143; 455/518, 519, 67.12, 404.2, 455/404.1, 440, 456.1, 457
See application file for complete search history.

(56) References Cited

U.S. PATENT DOCUMENTS

| | | | |
|---|---|---|---|
| 6,204,844 B1 * | 3/2001 | Fumarolo et al. | 715/736 |
| 6,477,387 B1 * | 11/2002 | Jackson et al. | 455/519 |
| 6,608,559 B1 * | 8/2003 | Lemelson et al. | 340/539.13 |
| 6,885,874 B2 * | 4/2005 | Grube et al. | 455/520 |
| 2002/0005894 A1 * | 1/2002 | Foodman et al. | 348/143 |
| 2004/0113933 A1 * | 6/2004 | Guler | 345/716 |
| 2004/0161133 A1 * | 8/2004 | Elazar et al. | 382/115 |
| 2004/0240542 A1 * | 12/2004 | Yeredor et al. | 375/240.01 |
| 2006/0224797 A1 * | 10/2006 | Parish et al. | 710/62 |
| 2007/0018880 A1 * | 1/2007 | Huston | 342/45 |
| 2007/0239824 A1 | 10/2007 | Shaffer | |
| 2008/0037461 A1 * | 2/2008 | Biltz et al. | 370/328 |

OTHER PUBLICATIONS

NiceVision, Instrusion Detection Product Overview, Mar. 28, 2005; www.nice.com; 2 pages.
Sypixx Networks, Inc.; IP Video (Network Media Devices) Product Information, [Retrieved Jul. 5, 2011]; 4 pages; www.sypixx.com.

* cited by examiner

*Primary Examiner* — June Sison
(74) *Attorney, Agent, or Firm* — Patent Capital Group

(57) ABSTRACT

In one particular embodiment, surveillance information is determined from a surveillance system. The surveillance information provides information on an event being monitored by the surveillance system. It is determined if a virtual talk group should be created for the event. If so, the virtual talk group is created such that a plurality of users in the virtual talk group can communicate with each other in the virtual talk group.

17 Claims, 3 Drawing Sheets

VIDEO CONTROLLED VIRTUAL TALK GROUPS

TECHNICAL FIELD

Particular embodiments of the present invention generally relate to telecommunications and more specifically to using video surveillance information to manage virtual talk groups.

BACKGROUND

Video surveillance systems are deployed to combat security threats. For example, a video surveillance system may track an object, such as an individual, who may be roaming around a premise. An image of the object is then transmitted from cameras to a control center.

In the control center, a dispatcher may monitor the object on the surveillance system and communicate with other personnel/agents that are on the premises to tell them where the object is. For example, a dispatcher may contact various security personnel who are closest to the object and tell them where the object is moving and where to go. This is a manual process that may take valuable time in determining which agents to contact. Further, the dispatcher also has to determine where the object is moving to guide the agents. As an object is moving around to different areas, it becomes even harder coordinating different agents that may be in different areas.

DESCRIPTION OF EXAMPLE EMBODIMENTS

Overview

In one particular embodiment, surveillance information is determined from a surveillance system. The surveillance information provides information on an event being monitored by the surveillance system. It is determined if a virtual talk group should be created for the event. If so, the virtual talk group is created such that a plurality of users in the virtual talk group can communicate with each other in the virtual talk group.

Description of Example Embodiments

Figure 1:
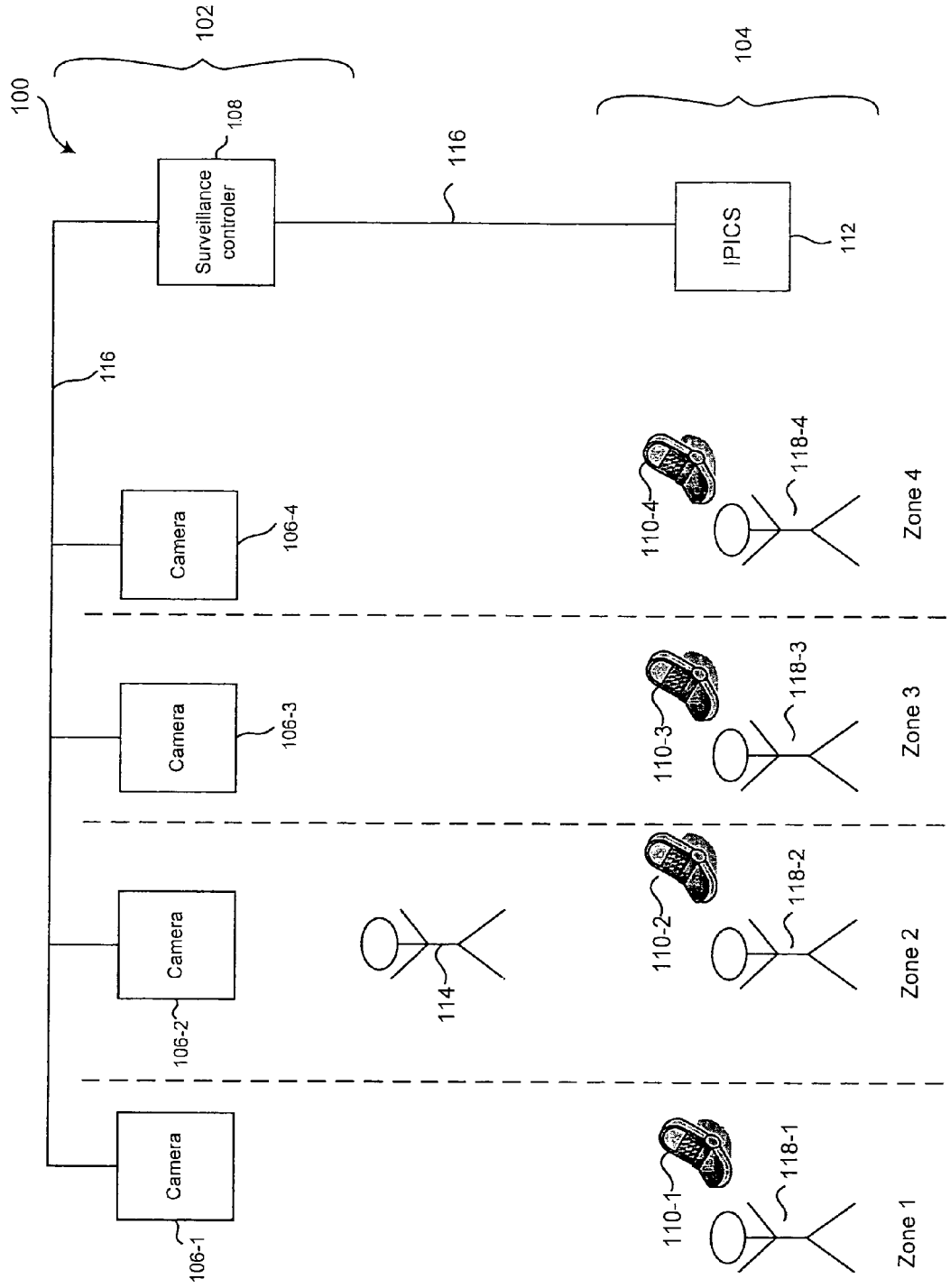
FIG. 1 depicts an example system for managing virtual talk groups using surveillance information.

FIG. 1 depicts an example system for managing virtual talk groups using surveillance information. As shown, a video surveillance system 102 and communication system 104 are provided. Video surveillance system 102 includes one or more cameras 106 and a video surveillance controller 108. Communication system 104 includes one or more end points 110 and an IP interoperability and collaboration system (IPICS) 112

Cameras 106 may be any devices that can provide video information of an object 114. Video information may be any information about an object that is recorded and is not limited to just video. For example, video, images, audio, etc. of object 114 may be sent back to video surveillance controller 108.

Cameras 106 may be organized into zones that each camera monitors. For example, zones 1-4 may be monitored as shown in FIG. 1.

Although cameras 106 are described, it will be understood that cameras 106 may be any information collection devices that may provide video information to video surveillance controller 108. For example, cameras 106 may be audio recording devices that record sounds emitted from object 114. Further, cameras 106 may include infrared lasers that record when a beam is broken. A person skilled in the art will appreciate other devices that may be used. For discussion purposes, cameras are discussed but it will be recognized that cameras may be any information collection devices, or combination thereof. Further, although video information is discussed, it will be recognized that any type of information may be provided by cameras 106.

Cameras 106 send the video information to video surveillance controller 108 through a network 116. Network 116 may be any network, such as a local area network (LAN), wide area network (WAN), etc. Network 116 may be a wireless or wire-line network that may send analog and/or internet protocol (IP) information. For example, the communications may be over an IP network; however, other communication may be used including over proprietary communication links.

Video surveillance controller 108 then uses the video information to determine the surveillance information to provide to IPICS 112. The surveillance information may be analytic information determined for object 114. For example, the surveillance information may be a location, facial features, clothing colors, backpack, luggage, or any other related information for object 114. Each camera 106 may monitor various zones or areas. A person skilled in the art will appreciate surveillance systems and how they operate. As object 114 moves through each zone, it appears in video transmitted by different cameras 106 video surveillance controller 108 over network 116. Video surveillance controller 108 employs known video analytics algorithms to extract the features of the object 114 and determines the location information for object 114. For example, if object 114 moves from zone 2 to zone 3, video surveillance controller 108 using video analytics algorithms may determine that object 114 is in zone 3 because an image of object 114 has been transmitted by camera 106-3, which is in zone 3, and also may be moving towards zone 4. In one particular embodiment, the surveillance system may detect when the object 114 drops any sub-object such as his backpack.

Communication system 104 includes a plurality of end points 110 that can communicate with IPICS 112. End points 110 may be any communication devices, such as cellular phones, personal digital assistants (PDAs), push-to-talk devices, laptop computers, devices with instant message (IM) clients, etc.

End points 110 may be associated with various users 118. Users 118 may be security agents/personnel for a premises being monitored using video surveillance system 102. As used, agents, users, and personnel may refer to the same entity/entities. In one particular embodiment, users 118 may be situated in various zones. For example, each user may be assigned to monitor a specific zone, such as user 118-1 is in zone 1, user 118-2 is in zone 2, etc. However, users may also roam thus requiring a determination of a location where users 118 are located.

IPICS 112 may be any network device configured to manage communications with end points 110. IPICS 112 may communicate with end points 110 through any network, such as a local area network, wide area network, cellular network, the Internet, an intranet, extranet, public switch telephone network (PSTN), or any other wireless or wire-line communication network. For example, the communications may be over an IP network; however, other communication may be used including over proprietary communication links.

IPICS 112 is configured to create and manage virtual talk groups (VTGs). A virtual talk group may be any group in which members of the group may communicate with each other. For example, a virtual talk group may be formed with three members using devices 110-1, 110-2, and 110-3. Users using end points 110-1, 110-2, and 110-3 may communicate with each other in the virtual talk group. Because in this example end point 110-4 is not included in the virtual talk group, a user associated with that end point cannot communicate in the created virtual talk group. Other users 118 (not shown) may also be added by IPICS 112 and included in the specific VTG.

Particular embodiments of the present invention determine if an event in the surveillance information requires creation of a virtual talk group. For example, a person leaving an object or passing an object to someone else, violation of e.g., traffic light, or carrying e.g., a gun in a place where it is prohibited, etc. may be events that cause creation of a virtual talk group. Although object 114 is used as triggering creation of a virtual talk group, it will be recognized that any event may trigger creation of the virtual talk group object (animate or inanimate) may be monitored. For example, IPICS 112 creates a virtual talk group that is used by users to communicate with each other about object 114. As conditions change (e.g., object 114 moves to different locations), different users 118 may need to be communicated with while other users 118 may not be needed anymore (e.g., because they are too far away, etc.). Particular embodiments automatically manage a virtual talk group associated with object 114 and add or remove users 118 as needed based on certain conditions and pre-programmed policies.

Accordingly, IPICS 112 receives the surveillance information from video surveillance controller 108 determined based on the video analytics and is configured to dynamically determine members for a virtual talk group. If a virtual talk group already exists for object 114, then IPICS 112 may decide to add members to the virtual talk group, remove members, or keep the virtual talk group the same. If a virtual talk group has not been created for object 114, then IPICS 112 may create a new one. For example, as the video surveillance controller 108 and the associated video analytics algorithm determines that the object 114 left his/her backpack and is moving away from it, IPICS system 112 in collaboration with video surveillance controller 108 may decide to create a VTG that includes the dispatcher (not shown) and users 118 from the zone. Further, it will be understood that multiple virtual talk groups may be created for object 114. For example, object 114 may leave something in a prior zone, such as a package, and a virtual talk group may be created for the package that is in one location and a virtual talk group may be created for a person that continues to move around the premises.

In one particular embodiment, the surveillance information includes location information for object 114 and/or the direction object 114 is moving. Other information may also be appreciated. IPICS 112 may then determine which members to include in a virtual talk group based on the location information. Agent information may also be used. Agent information may be information about users 118 or end points 110, such as the location of end points 110. For example, if an object is in zone 2, users 118 that are closest to zone 2 may be included in the virtual talk group. In one example, the three users 118 using end points 110 that are closest, i.e., the three users 118 associated with end points 110-1, 110-2, and 110-3 may be included in the virtual talk group because they are closest to zone 2. As object 114 changes location, members may be added to or removed from the virtual talk group.

A dispatcher (not shown) may also be included in the virtual talk group. Thus, the members of the virtual talk group may communicate with the dispatcher and with each other to discuss further actions. By automatically adjusting the members in the virtual talk group according to the video analytics information and agent information, IPICS 112 facilitates communication among the members that are deemed to be the most relevant to effectively perform actions related to object 114. This automatically helps focus the right resources on the current event and alleviates confusion by removing other users that are not required to be in communication with the dispatcher. Thus, only relevant users 118 for a specific operation are included. This is performed automatically using IPICS 112 in accordance with the pre-programmed policies.

Figure 2:
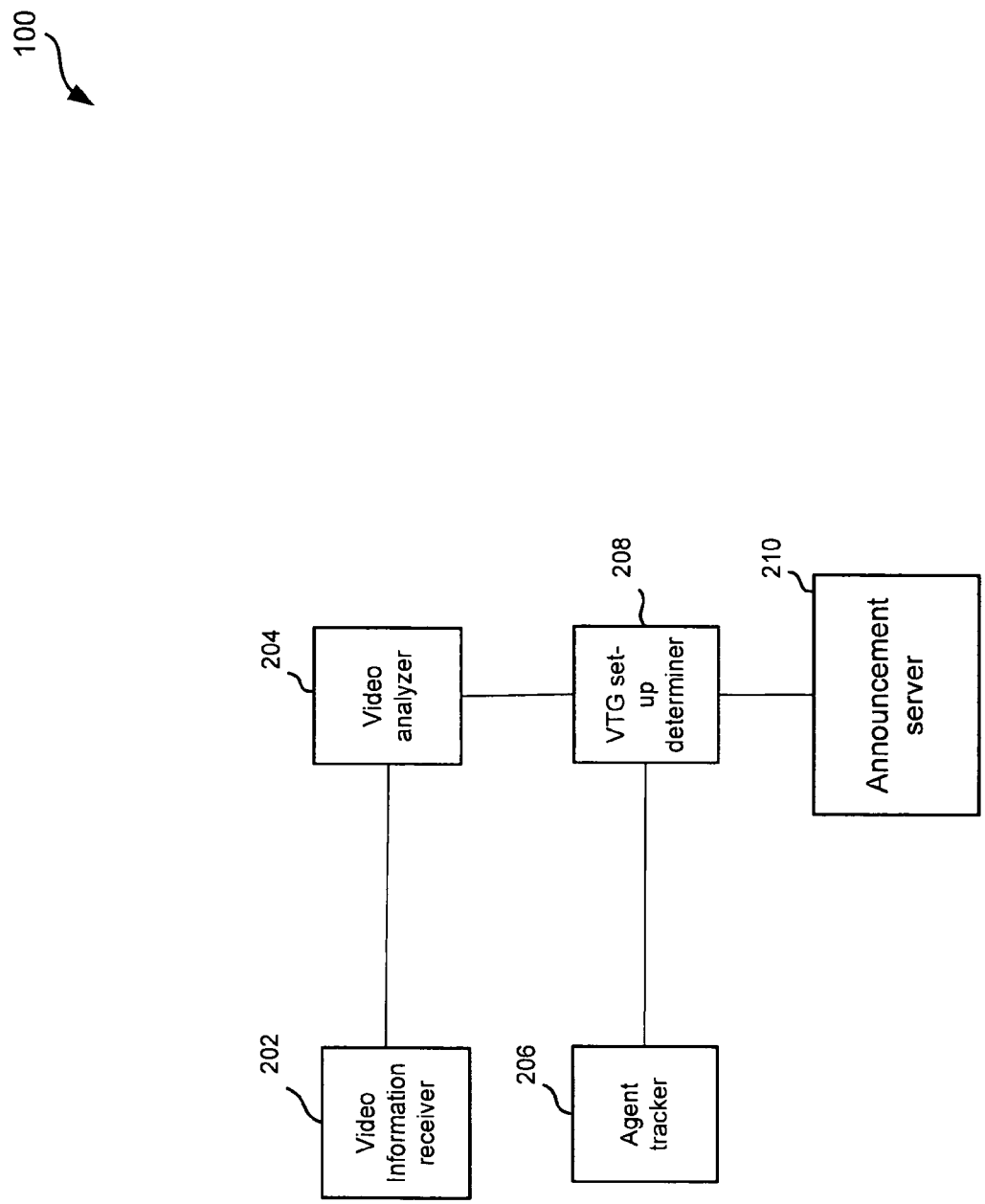
FIG. 2 depicts a more detailed example of the system in FIG. 1.

FIG. 2 depicts a more detailed example of the system in FIG. 1. As shown, a video information receiver 202, a video analyzer 204, an agent tracker 206, a VTG set-up determiner 208, and an announcement server 210 are provided. Although these entities are described as being part of video surveillance controller 108 and IPICS 112, it will be understood that functions performed by any of the entities may be performed in either video surveillance controller 108, IPICS 112, or any other device. For example, a separate device other than video surveillance controller 108 and IPICS 112 may be used to perform functions described in particular embodiments of the present invention.

Video information receiver 202 receives the video information from cameras 106. The video information is received over network 116.

Video analyzer 204 is configured to analyze the video information, such as video signals and generates the relevant object related information. In one particular embodiment, video analytics algorithms are used to analyze video signals that may be provided by a surveillance system. An application programming interface (API) may be used to access component reports of the location and other related information of object 114 that is received at video information receiver 202. A person skilled in the art will appreciate the video analytics algorithms that may be used. For example, analytics may be use to determine where an object is moving from and to. In one example, the video analytics algorithms may track object 114 and determine it has moved from zone 2 to zone 3 using video information received from camera 106-2 and camera 106-3. If multiple objects are being tracked and analyzed, the video analytics algorithms may distinguish object 114 from the other objects. Thus, as object 114 moves throughout system 100, video analytics algorithms are used to distinguish the same object moving through images of video from different cameras 106. Video analyzer 204 then sends the surveillance information to VTG set-up determiner 208.

VTG set-up determiner 208 determines if a virtual talk group should be created based on pre-programmed policies if one has not been created before. If a virtual talk group should be created, VTG set-up determiner 208 determines which users 118 should be members of the virtual talk group based on pre-programmed policies. VTG set-up determiner 208 may use the surveillance information and agent information from agent tracker 206 to dynamically determine if a VTG needs to be established and if yes, decide on who the members of the relevant VTG should be. The agent information may be any information about users 118 of end points 110. For example, the agent information is the location of agents in system 100. Also, the agent information may be information other than location, such as roles, skills or capabilities of the agents with regard to equipment, network performance, security level, security experience, assignments to zones, etc.

Agent tracker 206 may continuously monitor the location of end points 110. In one example, global positioning satellite (GPS) information may be used to track where end points 110 are. Also, other methods of determining the location of end points 110 may be used, such as information obtained from analyzing the video stream and identifying the location of the agents within each monitored zone. It is assumed that users 118 are associated with each end point 110. Agent tracker 206 sends the agent information to VTG set-up determiner 208.

VTG set-up determiner 208 then uses the surveillance information and the agent information to determine which members to include in a virtual talk group for object 114. In one particular embodiment, VTG set-up determiner 208 determines a virtual talk group that has already been created for object 114. VTG set-up determiner 208 identifies the current members of the virtual talk group. Then, any members to add or remove from the virtual talk group are dynamically determined. If a virtual talk group has not already been created, then VTG set-up determiner 208 creates a new virtual talk group.

Various policies may be used to determine which members should be included in the virtual talk group based on the surveillance information and agent information. A proximity radius may be configured. For example, the radius covered by zones pictured in FIG. 1 may be used and any agent in that zone may be included in the virtual talk group. In another particular embodiment, the closest users, such as the closest three agents, may be included in the virtual talk group with the dispatcher. Information other than location, such as roles, skills or capabilities of the agents with regard to equipment, network performance, security level, security experience, etc. may also be applied to a policy to determine the members of the virtual talk group. The policies may be dynamically applied by VTG set-up determiner 208.

End points 110 for users are then connected to the virtual talk group. Thus, the users using these end points 110 can now talk amongst themselves in the virtual talk group. Further, as mentioned above, a dispatcher or any other relevant person may also be included in the virtual talk group. A dispatcher may then communicate information to the users on what actions they should take. In one particular embodiment, the users may use push to talk mechanisms to talk in the virtual talk group. For example, when one user wants to talk to the others, a push to talk mechanism is selected and the user can speak in the virtual talk group.

In one particular embodiment, a pre-announcement message may be provided to members that are being added to the virtual talk group. For example, announcement server 210 may be used to send an announcement to the new members. The announcement may be determined automatically from the surveillance information and/or agent information. For example, video analytics algorithms may be used to analyze the video information and provide relevant information about object 114. In one example, the message may be: "Please pay attention to the gentleman wearing the blue hat who is carrying a green backpack. If he attempts to pass the backpack to someone else, please stop both subjects." Further, a dispatcher or a current member of the virtual talk group may record a message, which announcement server 210 can play to new members of the virtual talk group. In other examples, the recorded message may be based on presence information, network capabilities, pictures of object 114, etc. For example, a picture of object 114 may be sent to the new members of the virtual talk group before they are added.

In one particular embodiment, a virtual talk group may be set up that includes all the new members and announcement server 210. Announcement server 210 then plays the announcement in the virtual talk group for the new members. After the announcement is played, VTG set-up determiner 208 drops the new members from the virtual talk group with announcement server 210 and connects the new members to the virtual talk group associated with object 114. Consequently, the new members may communicate with any other members in the virtual talk group associated with object 114.

Figure 3:
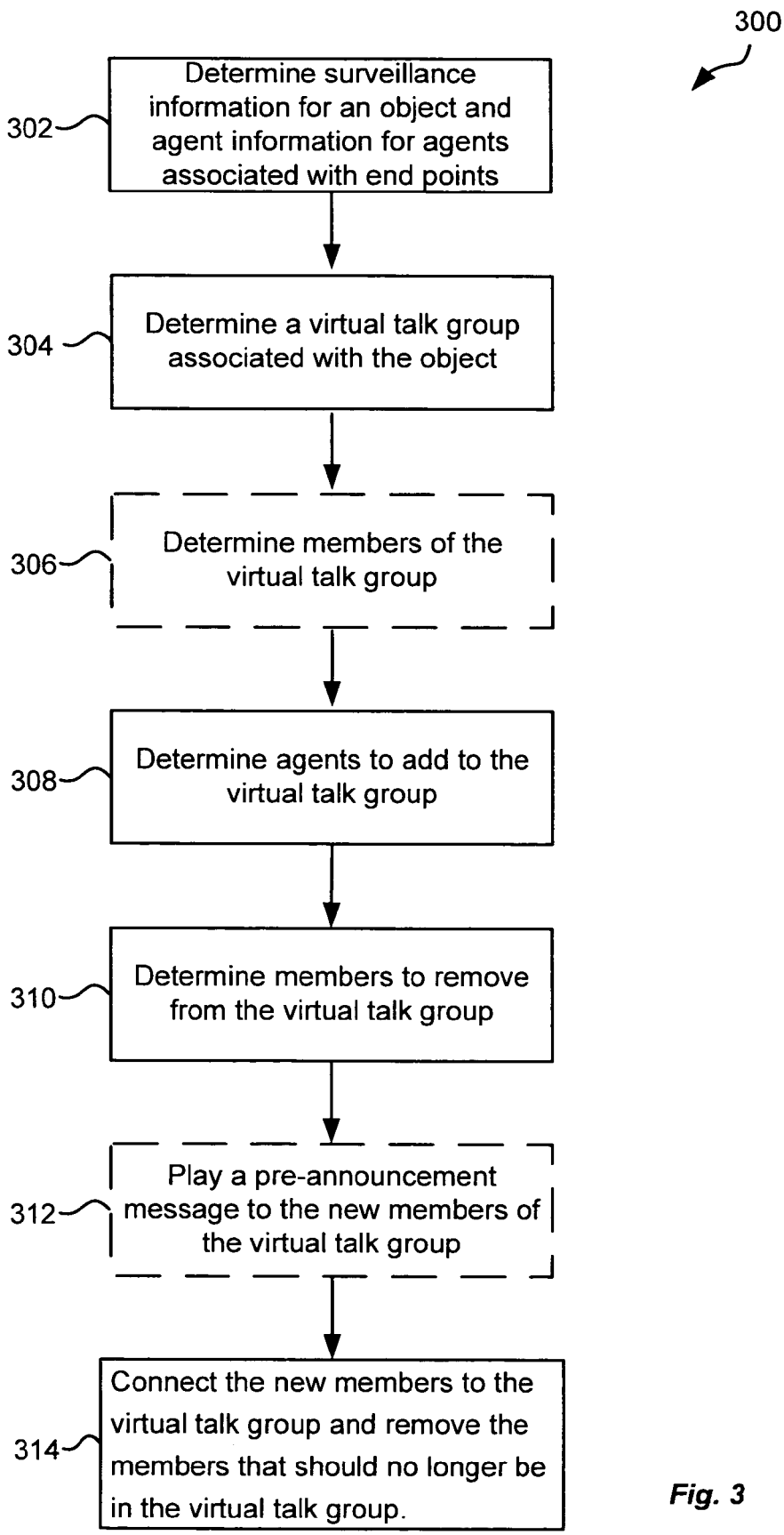
FIG. 3 depicts a simplified example of a method for connecting users to a virtual talk group.

FIG. 3 depicts a simplified example of a method for connecting users to a virtual talk group Step 302 determines surveillance information for object 114 and agent information for users associated with end points 110. The surveillance information may be information on the location of object 114 the direction it is moving, visual features of the object, etc., and the agent information may be location information for end points 110.

Step 304 automatically determines a virtual talk group associated with object 114. A virtual talk group may already have been created for object 114 or a new one may be created.

Step 306 determines members of the virtual talk group. For example, if the virtual talk group already existed, then the current members are determined. If the virtual talk group had not existed, this step may be skipped.

Step 308 determines users to add to the virtual talk group. As described above, policies may be applied to the agent information and surveillance information to determine which users to add to the virtual talk group.

Step 310 then determines members to remove from the virtual talk group. This is only if the virtual talk group already existed. For example, certain members may no longer be relevant to monitoring object 114 and thus should be removed.

Step 312 is an optional step that plays a pre-announcement message to the new members of the virtual talk group. This pre-announcement message may give some information on object 114 for the new members.

Once the pre-announcement is sent, step 314 automatically connects the new members to the virtual talk group, and also removes the members that should no longer be in the virtual talk group.

In one example, according to particular embodiments of the present invention, an object 114 may be an intruder being monitored by cameras 106. As the intruder moves in system 100, different cameras 106 may take video of the intruder. For example, an intruder may move from zone 1 to zone 2 to zone 3, etc. As the video is taken, it is analyzed and it is determined that there is an intruder in the zones. The location of the intruder is determined and sent to IPICS 112 over the network 116.

IPICS 112 then determines which agents are in the local vicinity of the intruder or otherwise required per pre-programmed policy to join the VTG associated with this event. GPS information for end points 110 that are being carried by each agent may be used to determine which agents are closest to the intruder.

In one case, this may be the first instance of seeing the intruder and thus a new virtual talk group is created with the closest members. A pre-announcement may be played indicating that the intruder is wearing a green shirt and also carrying an object. When the virtual talk group is created, the agents may be able to communicate amongst themselves in addition to other users who participate in this VTG, such as a dispatcher.

In another example, a virtual talk group may have already been created for the intruder but the intruder has moved into a different area. In this case, the video information is analyzed to determine the new location for the intruder. IPICS 112 then determines which agents should now be part of the VTG. For example, different agents may be closer to the intruder. Thus, the agents that are closest (e.g., the closest three) are added to the virtual talk group if they are not already a member. Further, if it is determined that an agent is not one of the closest three, then that agent is removed from the VTG. This eliminates confusion as to which agents are being told to do which actions. This also more accurately provides information to the best agents that can take action against the intruder. The dispatcher may then dispatch instructions to the agents in the virtual talk group. In one particular embodiment, the video analytics algorithm detects that the intruder is armed with a gun. As a result, a policy triggers the addition of other agents who are qualified to deal with the new threat.

The above process may be continuously repeated as object 114 is monitored. IPICS 112 is configured to dynamically update the virtual talk group for object 114 as conditions change.

Although the invention has been described with respect to specific particular embodiments thereof, these particular embodiments are merely illustrative, and not restrictive of the invention.

Any suitable programming language can be used to implement the routines of particular embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments of the present invention. One skilled in the relevant art will recognize, however, that an particular embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments of the present invention.

A "computer-readable medium" for purposes of particular embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Particular embodiments of the present invention can be implemented in the form of control logic in software or hardware or a combination of both. The control logic may be encoded in one or more tangible media for execution to direct an information processing device to perform a set of steps disclosed in particular embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one particular embodiment", "an particular embodiment", or "a specific particular embodiment" means that a particular feature, structure, or characteristic described in connection with the particular embodiment is included in at least one particular embodiment of the present invention and not necessarily in all particular embodiments. Thus, respective appearances of the phrases "in one particular embodiment", "in an particular embodiment", or "in a specific particular embodiment" in various places throughout this specification are not necessarily referring to the same particular embodiment. Furthermore, the particular features, structures, or characteristics of any specific particular embodiment of the present invention may be combined in any suitable manner with one or more other particular embodiments. It is to be understood that other variations and modifications of the particular embodiments of the present invention described and illustrated herein are possible in light of the teachings herein and are to be considered as part of the spirit and scope of the present invention.

Particular embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments of the present invention, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated particular embodiments of the present invention and are to be included within the spirit and scope of the present invention.

Thus, while the present invention has been described herein with reference to particular embodiments thereof, a latitude of modification, various changes and substitutions are interided in the foregoing disclosures, and it will be appreciated that in some instances some features of particular embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   analyzing, at a video surveillance controller, first surveillance information from a first video surveillance system, the first surveillance information providing information on an event being monitored by the first video surveillance system;
   determining that a virtual talk group should be created for the event based on surveillance information from the first video surveillance system;
   automatically selecting a plurality of users to be members of the virtual talk group, wherein selection of each user in the plurality of users is based, at least in part, on user information relative to the event;
   sending an announcement to the plurality of users in the virtual talk group, wherein the announcement includes information on the event;
   automatically creating the virtual talk group such that the plurality of users in the virtual talk group can communicate with each other in the virtual talk group;
   adding or removing members of the virtual talk group as the event moves from the first video surveillance system in a first zone to a second video surveillance system in a second zone, wherein the first video surveillance system is separate from the second video surveillance system;
   receiving additional surveillance information from the first video surveillance system, the additional surveillance information providing additional information on the event being monitored by the first video surveillance system;
   determining a user to add to the virtual talk group based on the additional surveillance information;
   creating a second virtual talk group for sending an second announcement to the added user;
   sending the second announcement to the added user before the added user is added to the virtual talk group, wherein the second announcement is not sent to the virtual talk group, and wherein the announcement is based on the additional surveillance information; and
   disconnecting the added user from the second virtual talk group after the announcement.

2. The method of claim 1, further comprising:
   adding the user to the virtual talk group, wherein the user is able to communicate with other users of the virtual talk group.

3. The method of claim 1 further comprising:
   creating a second virtual talk group based on the additional surveillance information.

4. The method of claim 2, wherein determining the user to add to the virtual talk group comprises:
   determining user information for a second plurality of users associated with a plurality of end devices; and
   determining the user to add based on a pre-programmed policy using the user information and the additional surveillance information.

5. The method of claim 4, wherein the user information comprises location information determined for each of the plurality of end devices, wherein the additional surveillance information includes location information for an object.

6. The method of claim 4, wherein the user information comprises a profile of one or more users.

7. The method of claim 1, further comprising:
   receiving additional surveillance information from the second surveillance system, the additional surveillance information providing additional information on the event being monitored by the second video surveillance system; and
   determining any existing members to remove from the virtual talk group based on the additional surveillance information.

8. An apparatus comprising:
   at least one computer-readable medium comprising one or more instructions that when executed by at least one processor, cause the processor to:
   determine first surveillance information from a first video surveillance system that includes at least one hardware element, the first surveillance information providing information on an event being monitored by the first video surveillance system;
   determine that a virtual talk group should be created for the event based on the first surveillance information;
   select a plurality of users to be members of the virtual talk group, wherein selection of each user in the plurality of users is based, at least in part, on user information relative to the event;
   send an announcement to the plurality of users in the virtual talk group, wherein the announcement includes information on the event;
   create the virtual talk group such that a plurality of users in the virtual talk group can communicate with each other in the virtual talk group;
   add or remove members of the virtual talk group as the event moves from the first video surveillance system in a first zone to a second video surveillance system in a second zone, wherein the first video surveillance system is separate from the second video surveillance system;
   receive additional surveillance information from the first video surveillance system, the additional surveillance information providing additional information on the event being monitored by the first video surveillance system;

determine a user to add to the virtual talk group based on the additional surveillance information;

create a second virtual talk group for sending an second announcement to the added user;

send the second announcement to the added user before the added user is added to the virtual talk group, wherein the second announcement is not sent to the virtual talk group, and wherein the announcement is based on the additional surveillance information; and disconnect the added user from the second virtual talk group after the announcement.

9. The apparatus of claim 8, further comprising one or more instructions that when executed by the at least one processor, further cause the processor to:

add the user to the virtual talk group, wherein the user is able to communicate with other users of the virtual talk group.

10. The apparatus of claim 8, further comprising one or more instructions that when executed by the at least one processor, further cause the processor to:

create a second virtual talk group based on the additional surveillance information.

11. The apparatus of claim 9, further comprising one or more instructions that when executed by the at least one processor, further cause the processor to:

determine user information for a second plurality of users associated with a plurality of end devices; and determine the user to add based on a pre-programmed policy using the user information and the additional surveillance information.

12. The apparatus of claim 11, wherein the user information comprises location information determined for each of the plurality of end devices, wherein the additional surveillance information includes location information for an object.

13. A non-transitory computer readable media for performing operations, comprising:

analyzing, at a video surveillance controller, first surveillance information from a first video surveillance system, the first surveillance information providing information on an event being monitored by the first video surveillance system;

determining that a virtual talk group should be created for the event based on the first surveillance information;

automatically selecting a plurality of users to be members of the virtual talk group, wherein selection of each user in the plurality of users is based, at least in part, on user information relative to the event;

sending an announcement to the plurality of users in the virtual talk group, wherein the announcement includes information on the event;

creating the virtual talk group such that the plurality of users in the virtual talk group can communicate with each other in the virtual talk group;

adding or removing members of the virtual talk group as the event moves from the first video surveillance system in a first zone to a second video surveillance system in a second zone, wherein the first video surveillance system is separate from the second video surveillance system;

receiving additional surveillance information from the first video surveillance system, the additional surveillance information providing additional information on the event being monitored by the first video surveillance system;

determining a user to add to the virtual talk group based on the additional surveillance information;

creating a second virtual talk group for sending an second announcement to the added user;

sending the second announcement to the added user before the added user is added to the virtual talk group, wherein the second announcement is not sent to the virtual talk group, and wherein the announcement is based on the additional surveillance information; and disconnecting the added user from the second virtual talk group after the announcement.

14. The media of claim 13, further comprising:

adding the user to the virtual talk group, wherein the user is able to communicate with other users of the virtual talk group.

15. The media of claim 13, further comprising:

creating a second virtual talk group based on the additional surveillance information.

16. The method of claim 13, wherein the first surveillance information from the first video surveillance system includes a first object dropped by a second object, wherein the first object is in the first zone and the second object moves into the second zone, wherein the first zone is separate from the second zone.

17. The method of claim 16, further comprising:

creating the virtual talk group in the first zone to monitor the first object; and creating a second virtual talk group in the second zone to monitor the second object.

* * * * *